(12) United States Patent
Hadianto et al.

(10) Patent No.: US 9,382,815 B2
(45) Date of Patent: Jul. 5, 2016

(54) POWER GENERATING SYSTEM

(71) Applicant: KABUSHIKI KAISHA TOSHIBA, Tokyo (JP)

(72) Inventors: Mohammad Ashari Hadianto, Yokohama (JP); Mikhail Rodionov, Ebina (JP); Nobuo Okita, Yokohama (JP); Akihiro Taniguchi, Yokohama (JP); Katsuya Yamashita, Tokyo (JP); Osamu Furuya, Kawasaki (JP); Kazuo Takahata, Yokohama (JP); Mikio Takayanagi, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 152 days.

(21) Appl. No.: 13/944,180

(22) Filed: Jul. 17, 2013

(65) Prior Publication Data

US 2014/0020387 A1    Jan. 23, 2014

(30) Foreign Application Priority Data

Jul. 20, 2012  (JP) ................. 2012-162120

(51) Int. Cl.
*F01K 1/00*  (2006.01)
*F01K 1/02*  (2006.01)
(Continued)

(52) U.S. Cl.
CPC ... *F01K 7/24* (2013.01); *F01K 1/00* (2013.01); *F01K 1/02* (2013.01); *F01K 1/16* (2013.01); *F01K 3/00* (2013.01); *F01K 3/004* (2013.01); *F01K 3/02* (2013.01); *F01K 3/12* (2013.01);
(Continued)

(58) Field of Classification Search
CPC ............... F01K 1/00; F01K 1/02; F01K 1/16; F01K 13/00; F01K 13/006; F01K 13/02; F01K 3/262; F01K 7/24; F01K 7/38; F01K 3/00; F01K 3/12; F01K 3/02; F01K 3/004; F01K 23/10; F01K 25/08; F01K 3/14; Y02E 60/15; Y02E 10/10; F24J 2/07; F03G 6/067; F03G 7/04; F01D 17/02–17/105; F01D 19/00–19/02; F01D 21/00
See application file for complete search history.

(56) References Cited

U.S. PATENT DOCUMENTS 6,009,711 A      1/2000  Kreiger et al.
2009/0320828 A1*  12/2009 Koketsu ............. F01K 3/18
                                                126/585

FOREIGN PATENT DOCUMENTS

CN    102242697 A    11/2011
JP    S56-83505 A     7/1981
(Continued)

*Primary Examiner* — Kenneth Bomberg
*Assistant Examiner* — Wesley Harris
(74) *Attorney, Agent, or Firm* — Foley & Lardner LLP

(57) ABSTRACT

A power generating system includes a flow dividing structure, a first detector, a flow dividing adjusting valve, a heat accumulator, a heat exchanger and a turbine. The flow dividing structure divides a first heat medium into a first flow path and a second flow path. The first detector detects a flow rate of the first heat medium. The flow dividing adjusting valve opens the second flow path when the flow rate of the first heat medium exceeds a predetermined value. The heat accumulator accumulates the first heat medium via the second flow path and delivers the first heat medium at a temporally leveled flow rate. The heat exchanger transfers heat from the first heat medium to a second heat medium having a lower boiling point than the first heat medium. The turbine rotationally moves by the second heat medium with heat having been transferred by the heat exchanging unit.

8 Claims, 11 Drawing Sheets

(51) Int. Cl.
*F01K 1/16* (2006.01)
*F01K 13/00* (2006.01)
*F01K 13/02* (2006.01)
*F01K 3/00* (2006.01)
*F01K 3/02* (2006.01)
*F01K 7/24* (2006.01)
*F01K 7/38* (2006.01)
*F03G 6/06* (2006.01)
*F01K 3/12* (2006.01)
*F01K 25/08* (2006.01)
*F03G 7/04* (2006.01)
*F01K 23/10* (2006.01)
*F24J 2/07* (2006.01)
*F01K 3/16* (2006.01)
*F01K 3/26* (2006.01)

(52) U.S. Cl.
CPC . *F01K 3/16* (2013.01); *F01K 3/262* (2013.01); *F01K 7/38* (2013.01); *F01K 13/00* (2013.01); *F01K 13/006* (2013.01); *F01K 13/02* (2013.01); *F01K 23/10* (2013.01); *F01K 25/08* (2013.01); *F03G 6/067* (2013.01); *F03G 7/04* (2013.01); *F24J 2/07* (2013.01); *Y02E 10/10* (2013.01); *Y02E 60/15* (2013.01)

(56) References Cited

FOREIGN PATENT DOCUMENTS

| | | |
|---|---|---|
| JP | S63-253102 A | 10/1988 |
| JP | H01-174801 A | 7/1989 |
| JP | H11-125172 A | 5/1999 |
| JP | 2009-221961 A | 10/2009 |
| JP | 2010-071091 A | 4/2010 |
| JP | 2011-214451 A | 10/2011 |
| JP | 2012-013062 A | 1/2012 |
| WO | WO 2012/055426 * | 5/2012 |

* cited by examiner

POWER GENERATING SYSTEM

CROSS-REFERENCE TO RELATED APPLICATION

This application is based upon and claims the benefit of priority from the prior Japanese Patent Application No. 2012-162120, filed on Jul. 20, 2012; the entire contents of which are incorporated herein by reference.

FIELD

Embodiments described herein relate generally to a power generating system.

BACKGROUND

Slag discharged from a blast furnace of a steel plant is cooled and then crushed by a crusher and utilized as a mixed member of concrete or asphalt. As a method of cooling the slag, for example, a method of forcibly cooling the slag by spraying water thereto or the like is employed. When cooling the slag, a large amount of steam is intermittently generated and released into the atmosphere as it is without utilizing heat of the steam, resulting in energy loss.

DETAILED DESCRIPTION

As described above, there has been a problem of ineffective utilization of a large amount of intermittently generated steam to result in energy loss. Embodiments described herein have been made to solve the problem and their objects are to provide a power generating system capable of efficiently obtaining electric energy using a steam generating source with a temporally unstable supply.

In one embodiment, a power generating system includes; a flow dividing unit configured to divide a first heat medium supplied thereto to a first flow path and a second flow path; and a heat accumulating unit configured to accumulate the first heat medium sent thereto via the second flow path and deliver the first heat medium at a temporally leveled flow rate. The system further includes: a heat exchanging unit configured to transfer heat from the first heat medium sent thereto via the first flow path and the first heat medium delivered thereto from the heat accumulating unit, to a second heat medium that is lower in boiling point than the first heat medium; and a turbine configured to rotationally move with the second heat medium to which heat has been transferred by the heat exchanging unit.

In the power generating systems of embodiments, for example, waste heat steam discharged from a blast furnace is used as a steam generating source. In this case, when the steam of the steam generating source is directly utilized, solid matter, dust and dirt mixed in the waste heat steam may adversely affect the whole power generating system. Therefore, in the power generating systems of the embodiments, a heat exchanging unit is used to recover heat of the waste heat steam to a low-boiling medium, and the low-boiling medium thus obtained heat energy is used to drive a steam turbine for generating electric power. The systems also enable effective utilization of waste energy at a relatively low temperature (for example, about 200° C. or lower) generated from factories and blast furnaces. In other words, a binary power generating system is realized which utilizes the steam (a first heat medium) as the waste energy and the low-boiling medium (a second heat medium lower in boiling point than the first heat medium).

(Configuration of First Embodiment)

Figure 1:
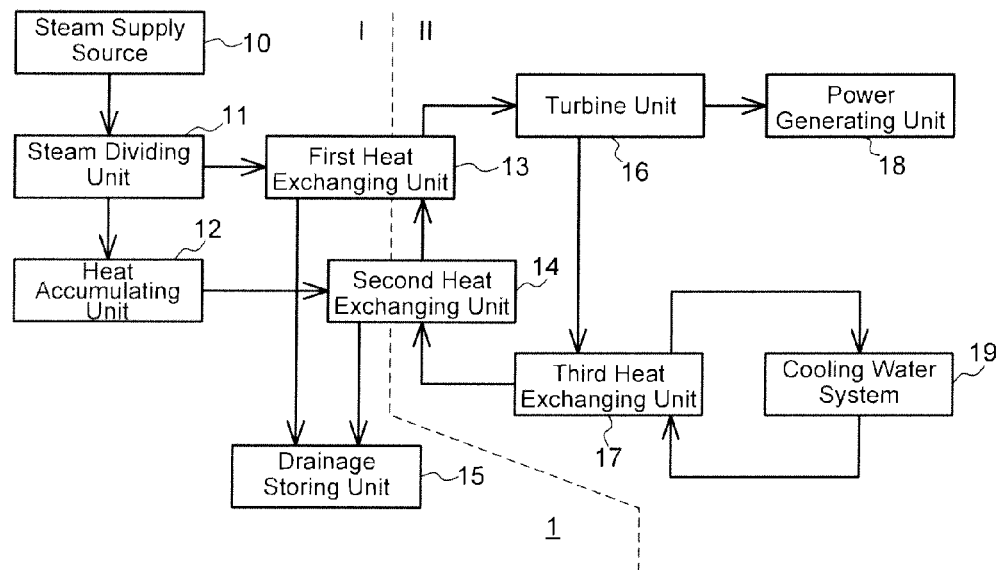
FIG. 1 is a diagram illustrating a functional configuration of a power generating system according to a first embodiment.

Hereinafter, a power generating system of a first embodiment will be described in detail with reference to the drawings. As illustrated in FIG. 1, a power generating system 1 of this embodiment includes a first system ("I" in FIG. 1) that temporally levels the supply amount (energy amount) of steam given from a steam supply source 10, and a second system ("II" in FIG. 1) that works with the energy received from the first system.

The first system includes the steam supply source 10, a steam dividing unit 11 (i.e., a flow dividing structure), a heat accumulating unit 12, a first heat exchanging unit 13, a second heat exchanging unit 14, and a drainage storing unit 15. The steam supply source 10 generates a heat medium for the first system and supplies the heat medium to the first system. As the heat medium for the first system (first heat medium), for example, steam (water vapor) generated from a factory or a blast furnace can be used. The supply amount of the steam supplied from the steam supply source 10 does not always need to be stable, but a steam generating source with a temporally unstable supply amount can be used. The steam supply source 10 sends the generated steam to the steam dividing unit 11.

The steam dividing unit 11 divides the steam supplied from the steam supply source 10 to a plurality of paths. In the example illustrated in FIG. 1, the steam dividing unit 11 divides the steam from the steam supply source 10 to two paths and sends the divided steams to the heat accumulating unit 12 and the first heat exchanging unit 13 respectively. The steam dividing unit 11 further includes a mechanism that detects the supply amount of the steam from the steam supply source 10, and a valve mechanism that opens and closes the divided paths. More specifically, the steam dividing unit 11 opens both of the paths when the supply amount of the steam from the steam supply source 10 exceeds a predetermined value, and closes the path to the heat accumulating unit 12 when the supply amount of the steam from the steam supply source 10 becomes equal to or less than the predetermined value. In other words, when the supply amount of the steam from the steam supply source 10 exceeds a criterion, the steam dividing unit 11 acts to send the excess amount of steam to the heat accumulating unit 12.

The heat accumulating unit 12 has a function of receiving the steam from the steam dividing unit 11 and accumulating heat energy like, for example, a steam accumulator. The heat accumulating unit 12 accumulates the steam given from the steam dividing unit 11 and thereby acts to temporally level the supply amount of the steam. The steam accumulated in the heat accumulating unit 12 is sent to the second heat exchanging unit 14.

The first heat exchanging unit 13 receives the steam from the steam dividing unit 11 and exchanges heat with a medium in the second system. The second heat exchanging unit 14 receives the steam from the heat accumulating unit 12 and exchanges heat with the medium in the second system. More specifically, the heat energy in the first system is shifted to the second system by the first heat exchanging unit 13 that performs heat exchange using the steam from the steam supply source 10 and by the second heat exchanging unit 14 that performs heat exchange using the steam temporally leveled by the heat accumulating unit 12.

The drainage storing unit 15 recovers the steams which have been subjected to heat exchange in the first heat exchanging unit 13 and the second heat exchanging unit 14. The steam (water) recovered by the drainage storing unit 15 may be utilized as a cooling water for generating steam in the steam supply source 10 or may be utilized in another system.

The second system includes the first heat exchanging unit 13, the second heat exchanging unit 14, a turbine unit 16, a third heat exchanging unit 17, a power generating unit 18, and a cooling water system 19. The second system circulates a medium lower in boiling point than the steam used in the first system (hereinafter, referred to as a "low-boiling medium" "second heat medium") so that the first heat exchanging unit 13 and the second heat exchanging unit 14 shift the heat energy from the first system to the second system. Thus, the first heat exchanging unit 13 and the second heat exchanging unit 14 generate steam of the low-boiling medium. As the low-boiling medium in the second system, for example, an alternative for chlorofluorocarbon such as HFC or the like, or a hydrocarbon-based substance such as butane can be used.

The turbine unit 16 converts the energy of the low-boiling medium which has received the heat energy from the first system into rotational kinetic energy. More specifically, the steam of the low-boiling medium generated by the first heat exchanging unit 13 and the second heat exchanging unit 14 generates rotational movement of a turbine shaft. The power generating unit 18 is connected to a rotation shaft of the turbine unit 16 so that a rotational movement of the rotation shaft generates electric power.

The third heat exchanging unit 17 (i.e., a cooler) acts to cool the low-boiling medium which has worked in the turbine unit 16 and return the cooled low-boiling medium to the first heat exchanging unit 13 and the second heat exchanging unit 14. The cooling water system 19 is a system that circulates a cooling water for the third heat exchanging unit 17 to recover the heat energy from the low-boiling medium.

(Operation of First Embodiment)

The operation of the power generating system of this embodiment will be described referring to FIG. 1 and FIG. 2. The steam supply source 10 is characterized in that it supplies steam to the first system but is temporally unstable in the supply amount of steam as illustrated by a solid line in FIG. 2.

Figure 2:
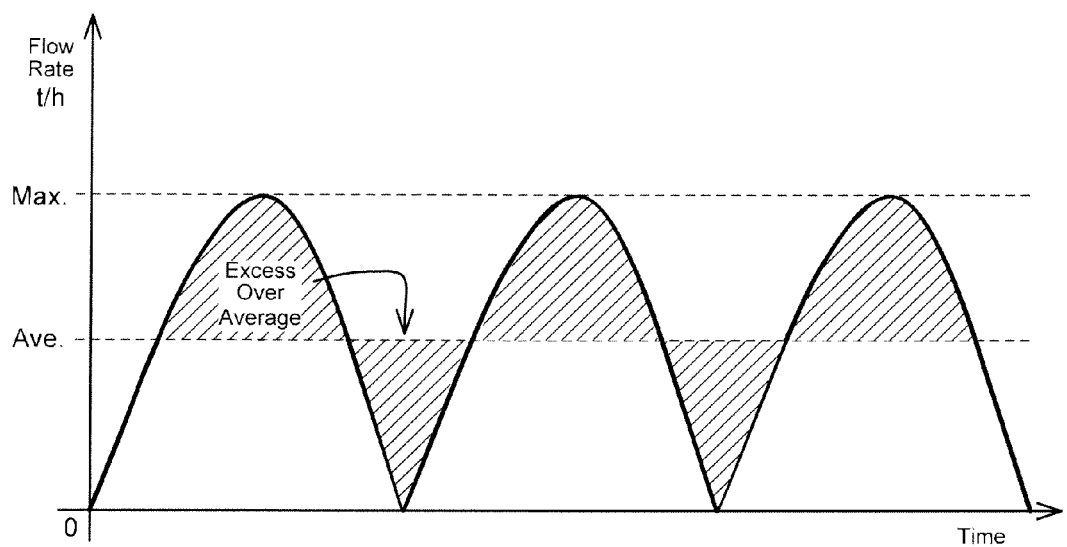
FIG. 2 is a chart explaining a steam supply source in the power generating system according to the first embodiment.

When receiving the steam at a flow rate as illustrated in FIG. 2, the steam dividing unit 11 supplies the received steam to both of the first heat exchanging unit 13 and the heat accumulating unit 12 when the flow rate of the received steam exceeds an average flow rate per hour ("Ave" in FIG. 2), and supplies the received steam only to the first heat exchanging unit 13 when the flow rate of the received steam is below the average flow rate per hour.

The first heat exchanging unit 13 transfers heat from the received steam to the low-boiling medium in the second system and thereby shifts the heat energy to the second system. On the other hand, the heat accumulating unit 12 receives the steam intermittently sent from the steam dividing unit 11 and accumulates the steam as hot water, and gives steam which has been reduced in pressure to the second heat exchanging unit 14. In other words, the heat accumulating unit 12 temporally levels the intermittent steam supply and supplies the temporally leveled steam to the second heat exchanging unit 14. The second heat exchanging unit 14 transfers the heat from the steam received from the heat accumulating unit 12 to the low-boiling medium in the second system and thereby shifts the heat energy to the second system. The first heat exchanging unit 13 and the second heat exchanging unit 14 send the steams after the heat exchange to the drainage storing unit 15.

In this event, the steam in the first system for which the second heat exchanging unit 14 performs heat exchange is the steam exceeding the average flow rate in the steam dividing unit 11 and temporally leveled by the heat accumulating unit 12, and therefore the heat energy of the steam exceeding the average flow rate will be delayed and shifted to the second system as illustrated by oblique line portions in FIG. 2. As a result, the second system can receive the temporally leveled heat energy.

The first heat exchanging unit 13 and the second heat exchanging unit 14 convert the low-boiling medium in the second system to steam and send the steam to the turbine unit 16. The turbine unit 16 works with the received steam of the low-boiling medium, whereby the power generating unit 18 generates electric power. The steam of the low-boiling medium which has worked in the turbine unit 16 is sent to the third heat exchanging unit 17 and cooled, and returned to the first heat exchanging unit 13 and the second heat exchanging unit 14. The cooling water system 19 sends the cooling water to the third heat exchanging unit 17 to cool the low-boiling medium in the second system.

As described above, according to the power generating system of this embodiment, the given steam is divided to a path in which the steam is directly subjected to heat conversion and a path in which the supply amount of the steam is temporally leveled by the heat accumulating unit. Further, according to the power generating system of this embodiment, the heat accumulating unit is provided to level the excess (or a flow rate exceeding a predetermined level) of the given steam. Consequently, even a temporally unstable steam supply source can realize stable heat conversion and thus power generation.

(Configuration of Second Embodiment)

Figure 3:
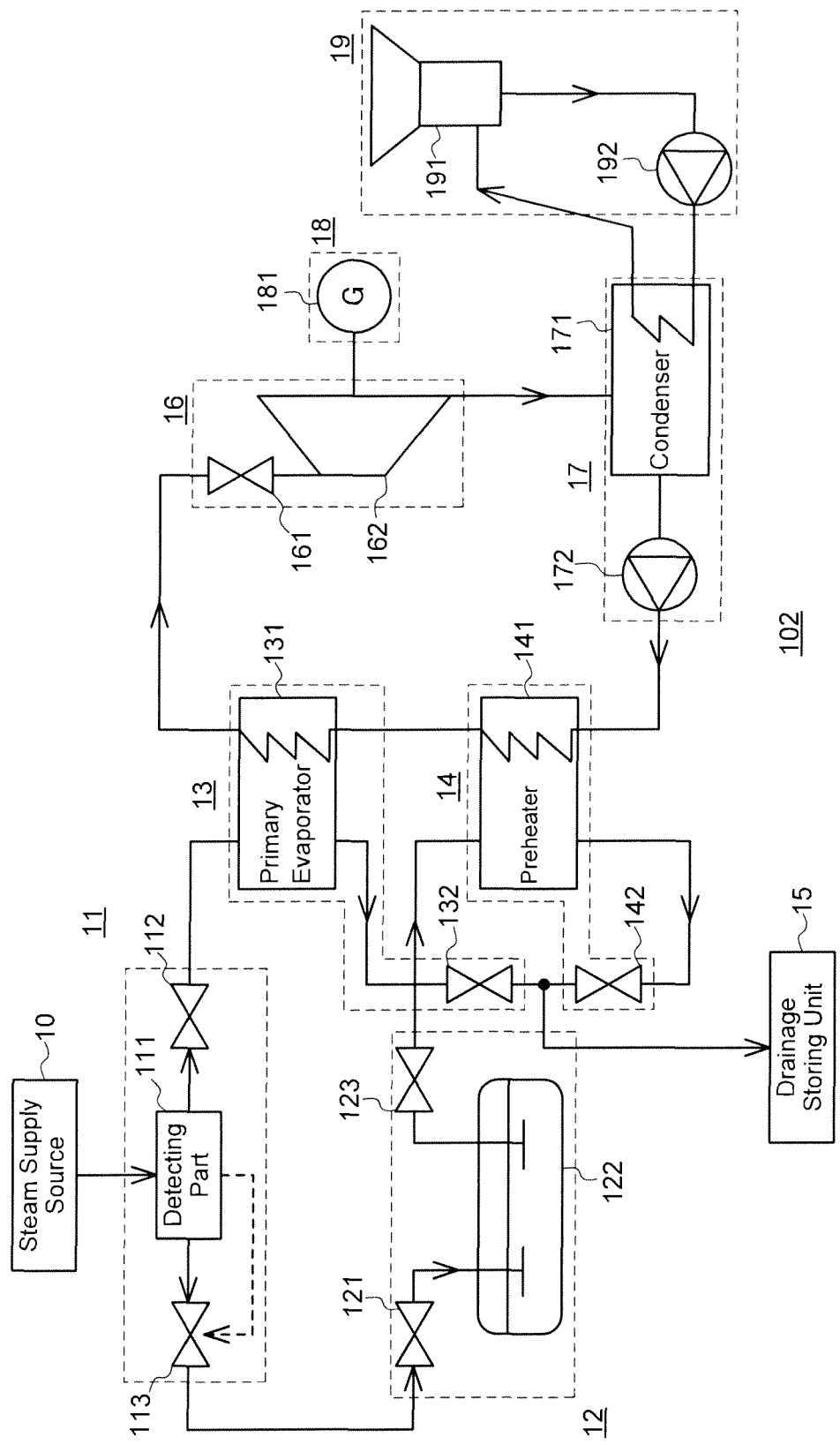
FIG. 3 is a diagram illustrating a configuration of a power generating system according to a second embodiment.

Next, a configuration of a power generating system of a second embodiment will be described with reference to FIG. 3. The power generating system of this embodiment is made by bringing the power generating system of the first embodiment into more concrete shape. In the following description, components in common with those of the first embodiment are denoted by common numerals to omit redundant description.

In a power generating system 102 of this embodiment, the steam dividing unit 11 includes a detecting part 111 (i.e., a first detector) that detects the flow rate of the steam received from the steam supply source 10, and pressure adjusting valves 112, 113 that control the flow rates of the divided steams. The heat accumulating unit 12 has a steam accumulator adjusting valve 121 that controls the flow rate of steam flowing thereinto, a steam accumulator 122 that accumulates received steam, and a steam accumulator adjusting valve 123 that controls the flow rate of steam to be delivered.

The first heat exchanging unit 13 has a primary evaporator 131 that receives the steam from the pressure adjusting valve 112 of the steam dividing unit 11, and a backflow valve 132 that discharges the steam which has transferred heat in the primary evaporator 131 and prevents backflow of the steam. Similarly, the second heat exchanging unit 14 has a preheater 141 that receives the steam from the steam accumulator adjusting valve 123 of the heat accumulating unit 12, and a backflow valve 142 that discharges the steam which has transferred heat in the preheater 141 and prevents backflow of the steam. Note that the preheater 141 and the primary evaporator 131 are connected in series so that the low-boiling medium in the second system is first preheated by the preheater 141 and then converted into steam by the primary evaporator 131. Both outputs of the backflow valves 132 and 142 of the first heat exchanging unit 13 and the second heat exchanging unit 14 are led to the drainage storing unit 15.

The turbine unit 16 has a steam control valve 161 that adjusts the flow rate of given steam, and a medium turbine 162 that works by receiving the steam of the low-boiling medium from the steam control valve 161. The medium turbine 162 is connected coaxially with a medium turbine power generator 181 as the power generating unit 18 so that rotation of the medium turbine 162 causes the medium turbine power generator 181 to generate electric power.

The third heat exchanging unit 17 has a condenser 171 that receives the steam of the low-boiling medium discharged from the medium turbine 162 and condenses the received steam, and a medium pump 172 that sends the low-boiling medium which has been liquefied by the condenser 171 to the preheater 141. The cooling water system 19 has a cooling tower 191 that cools a medium (steam) to which the condenser 171 has recovered heat from the low-boiling medium, and a cooling water pump 192 that sends a cooling water outputted from the cooling tower 191 again to the condenser 171.

(Operation of Second Embodiment)

When receiving the steam at a temporally unstable flow rate from the steam supply source 10, the detecting part 111 of the steam dividing unit 11 detects the flow rate of the steam and controls the pressure adjusting valve 113 to adjust the flow rate of the steam to the heat accumulating unit 12. For example, when the steam received from the steam supply source 10 exceeds the average flow rate, the detecting part 111 controls the pressure adjusting valve 113 to send the steam to the heat accumulating unit 12, and when the steam is below the average flow rate, the detecting part 111 controls the pressure adjusting valve 113 to stop the steam to the heat accumulating unit 12. As a result, the primary evaporator 131 will receive the steam at the average flow rate or less at all times.

When receiving the steam from the steam dividing unit 11 via the steam accumulator adjusting valve 121, the steam accumulator 122 accumulates the steam as hot water and sends steam which has been reduced in pressure to the preheater 141 via the steam accumulator adjusting valve 123. As a result, the preheater 141 will receive the steam which has been made lower in pressure than the steam received from the steam supply source 10 and temporally leveled.

In this embodiment, since the steam outputted from the steam accumulator 122 has been made lower in pressure than the steam given from the steam supply source 10, the heat energy that the preheater 141 gives to the second system is lower than the heat energy that the primary evaporator 131 gives to the second system. Hence, the preheater 141 is disposed on the upstream side of the primary evaporator 131 in the second system. More specifically, the preheater 141 preheats the low-boiling medium which has been cooled by the condenser 171, using the steam outputted from the steam accumulator 122, and sends the preheated steam to the primary evaporator 131. The primary evaporator 131 evaporates the low-boiling medium preheated by the preheater 141, using the steam received from the steam supply source 10, and sends the evaporated low-boiling medium to the medium turbine 162.

The medium turbine 162 receives the steam of the low-boiling medium via the steam control valve 161 and generates rotational movement, whereby the medium turbine power generator 181 connected to the medium turbine 162 generates electric power. The steam of the low-boiling medium discharged from the medium turbine 162 is cooled by the condenser 171 and returned by the medium pump 172 to the preheater 141. The condenser 171 sends the cooling water which has recovered heat energy from the low-boiling medium, to the cooling tower 191, and the cooling water pump 192 returns the cooling water cooled by the cooling tower 191 to the condenser 171.

In the power generating system of this embodiment, the detecting part 111 and the pressure adjusting valve 113 are provided to send the excessive steam at the average flow rate or more to the steam accumulator 122 in correspondence with an intermittent steam generation pattern. In addition, the steam accumulator 122 acts to compensate for a deficit of steam in the primary evaporator 131 via the preheater 141. Consequently, even if the steam sent from the steam supply source 10 is not stable but intermittent, stable electrical output can be obtained.

Third Embodiment

Figure 4:
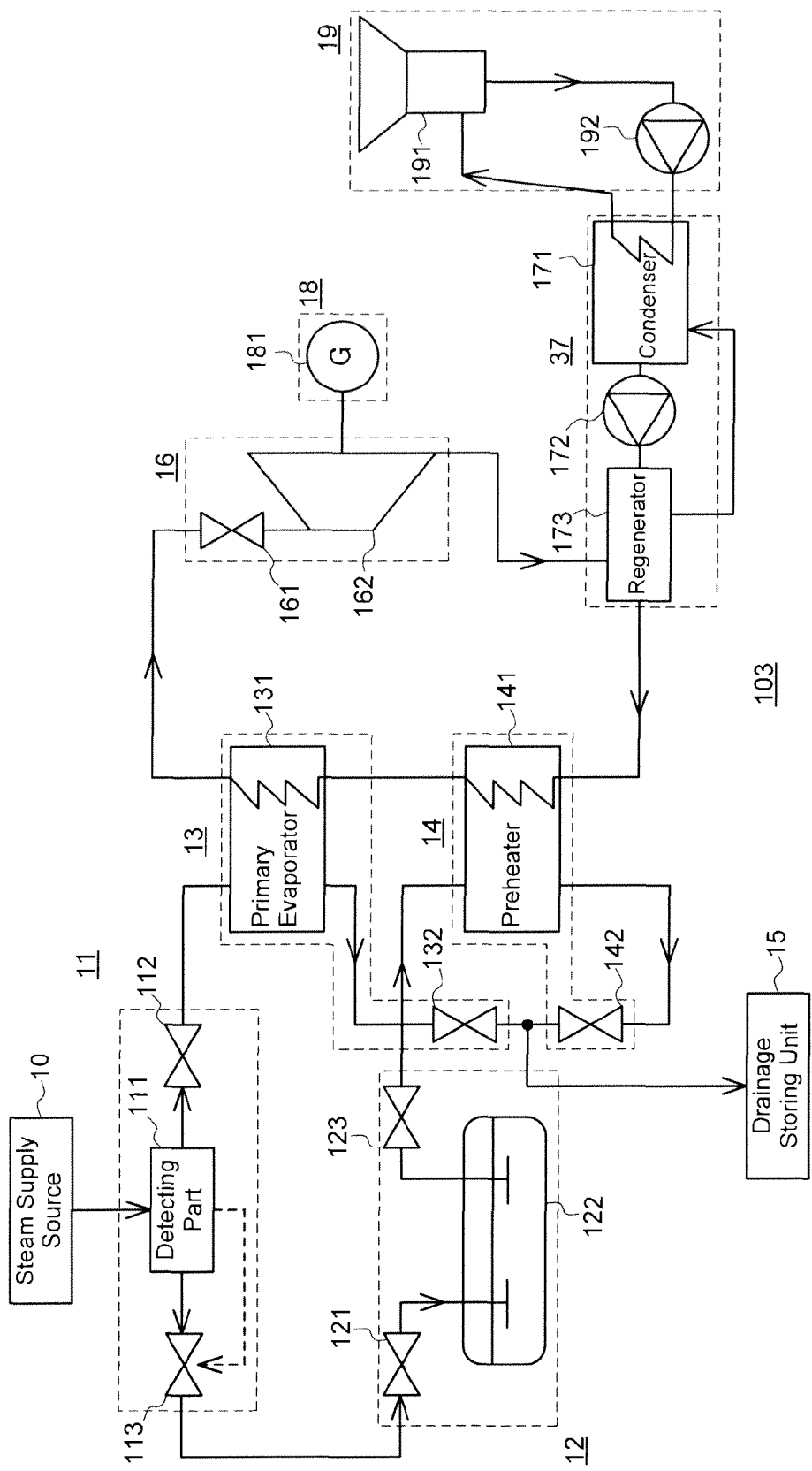
FIG. 4 is a diagram illustrating a configuration of a power generating system according to a third embodiment.

Next, a power generating system of a third embodiment will be described in detail with reference to FIG. 4. A power generating system 103 of this embodiment is made by modifying the configuration of the third heat exchanging unit 17 in the power generating system of the second embodiment. In the following description, components in common with those of the second embodiment are denoted by common numerals to omit redundant description. As illustrated in FIG. 4, a third heat exchanging unit 37 in the power generating system of this embodiment has a regenerator 173 in addition to the condenser 171 and the medium pump 172.

The regenerator 173 receives the low-boiling medium which has worked in the medium turbine 162 and transfers heat energy to the low-boiling medium sent by the medium pump 172. The low-boiling medium that obtained the heat energy is cooled in the condenser 171 and returned to the regenerator 173 by the medium pump 172. The third heat exchanging unit 37 of this embodiment can increase the cooling efficiency of the low-boiling medium which has worked in the second system and thus improve the power generation efficiency.

Fourth Embodiment

Next, a power generating system of a fourth embodiment will be described in detail with reference to FIG. 5. A power generating system 204 of this embodiment is made by modifying the configurations of the first heat exchanging unit 13 and the second heat exchanging unit 14 in the power generating system of the second embodiment. In the following description, components in common with those of the second embodiment are denoted by common numerals to omit redundant description.

Figure 5:
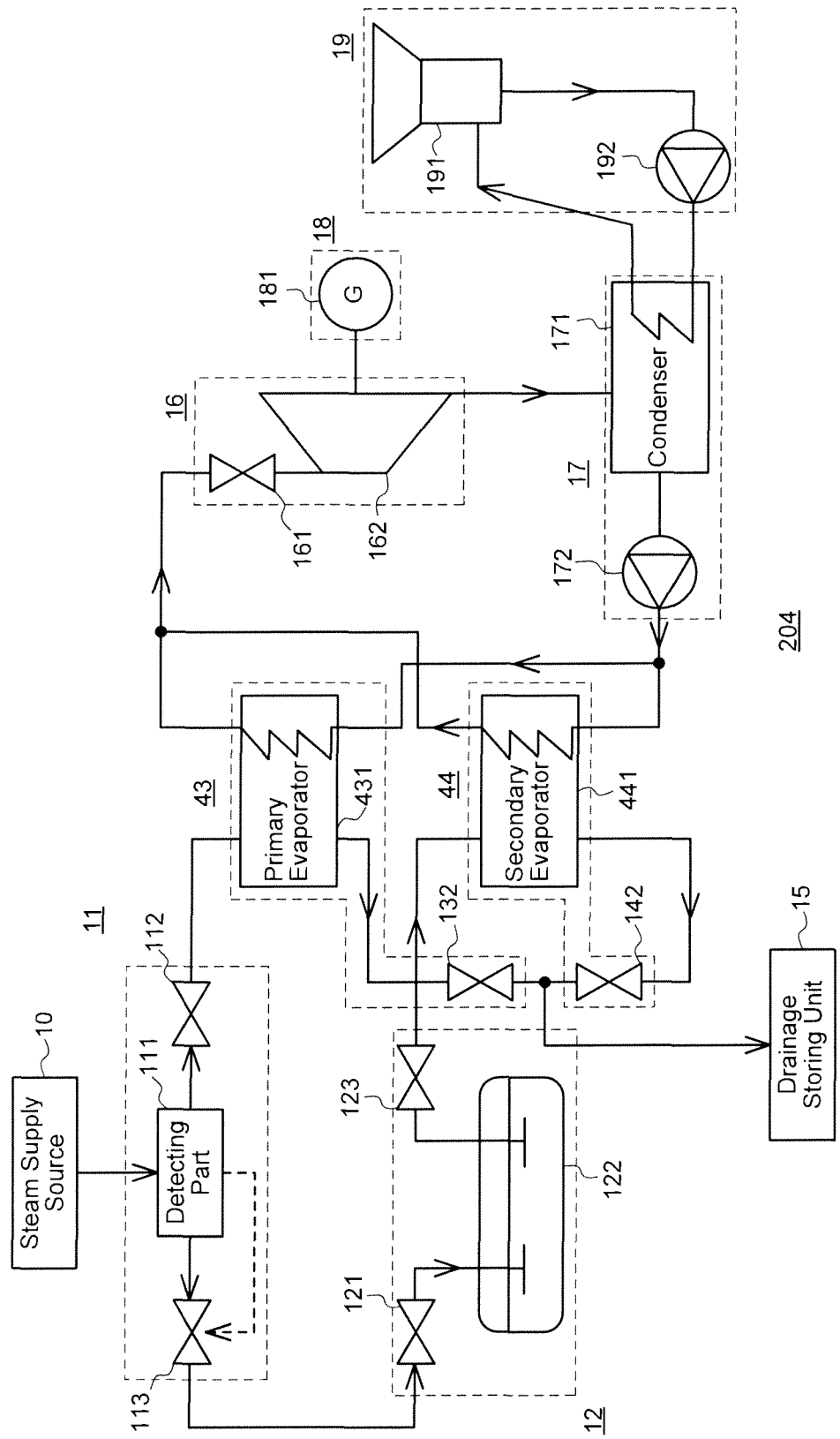
FIG. 5 is a diagram illustrating a configuration of a power generating system according to a fourth embodiment.

As illustrated in FIG. 5, in the power generating system 204 of this embodiment, a first heat exchanging unit 43 has a primary evaporator 431 that receives the steam from the pressure adjusting valve 112 of the steam dividing unit 11, and the backflow valve 132 that discharges the steam which has transferred heat in the primary evaporator 431 and prevents backflow of the steam. Similarly, a second heat exchanging unit 44 has a secondary evaporator 441 that receives the steam via the steam accumulator adjusting valve 123 of the heat accumulating unit 12, and a backflow valve 142 that discharges the steam which has transferred heat in the secondary evaporator 441 and prevents backflow of the steam. Both outputs of the backflow valves 132 and 142 of the first heat exchanging unit 43 and the second heat exchanging unit 44 are led to the drainage storing unit 15.

In the power generating system 204 of this embodiment, the low-boiling medium in the second system delivered from the medium pump 172 is sent to the primary evaporator 431 of the first heat exchanging unit 43 and also to the secondary evaporator 441 of the second heat exchanging unit 44. Then, the steams of the low-boiling medium generated by heat exchange by the primary evaporator 431 and the secondary evaporator 441 are respectively sent to the medium turbine 162 via the steam control valve 161 of the turbine unit 16. In other words, the first heat exchanging unit 43 and the second heat exchanging unit 44 are connected in parallel with each other with respect to the second system and individually generate the steams of the low-boiling medium for the second system.

This embodiment is preferable in the case where the difference between the pressure of the steam (heat energy) outputted from the steam accumulator 122 and the pressure of the steam (heat energy) given from the steam supply source 10 is relatively small. More specifically, when the flow rate of the steam from the steam supply source 10 is originally large and the influence by the pressure reduction by the steam accumulator 122 is small, the capacities that the primary evaporator 431 and the secondary evaporator 441 can perform heat exchange become equal. In this case, it is unnecessary to heat the low-boiling medium in the second system by a two-stage configuration of the preheater 141 and the primary evaporator 131 as in the second embodiment. In this case, the primary evaporator 431 and the secondary evaporator 441 can directly send the steams respectively to the turbine unit 16 in the power generating system 204 of this embodiment.

Also in the power generating system of this embodiment, even if the steam generated from the steam supply source 10 is not stable but intermittent, stable electrical output can be obtained. The power generating system of this embodiment is effective, in particular, in the case where the flow rate of the steam from the steam supply source 10 is large and large output from the steam accumulator 122 can be obtained.

Fifth Embodiment

Figure 6:
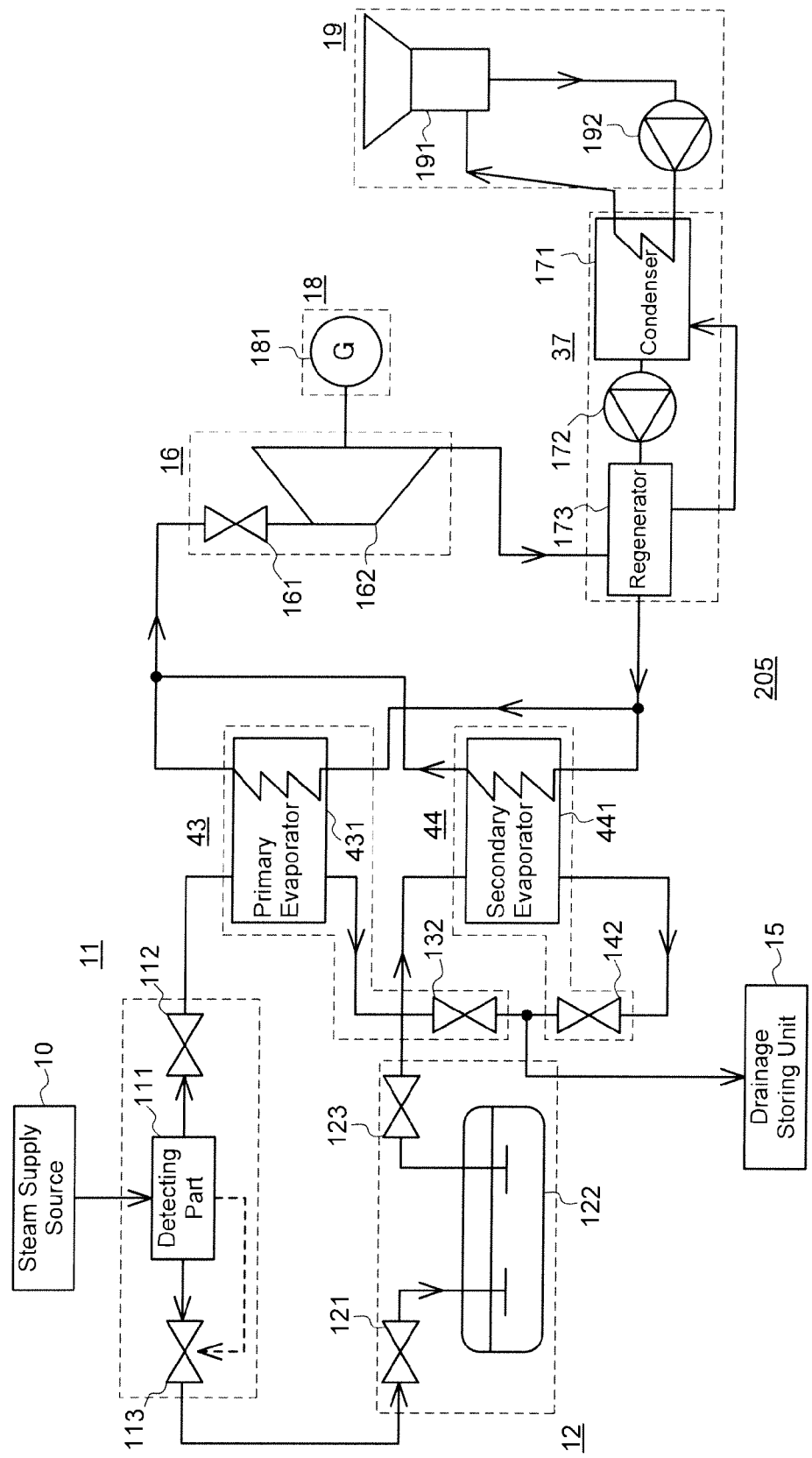
FIG. 6 is a diagram illustrating a configuration of a power generating system according to a fifth embodiment.

Next, a power generating system of a fifth embodiment will be described in detail with reference to FIG. 6. A power generating system 205 of this embodiment is made by modifying the configuration of the third heat exchanging unit 17 in the power generating system of the fourth embodiment. In the following description, components in common with those of the fourth embodiment are denoted by common numerals to omit redundant description. As illustrated in FIG. 6, the third heat exchanging unit 37 in the power generating system of this embodiment has the regenerator 173 in addition to the condenser 171 and the medium pump 172.

The regenerator 173 receives the low-boiling medium which has worked in the medium turbine 162 and transfers heat energy to the low-boiling medium sent by the medium pump 172. The low-boiling medium that obtained the heat energy is cooled in the condenser 171 and returned to the regenerator 173 by the medium pump 172. The third heat exchanging unit 37 of this embodiment can increase the cooling efficiency of the low-boiling medium which has worked in the second system and thus improve the power generation efficiency.

Sixth Embodiment

Next, a power generating system of a sixth embodiment will be described in detail with reference to FIG. 7. A power generating system 306 of this embodiment is made by modifying the configuration of the turbine unit 16 in the power generating system of the fourth embodiment. In the following description, components in common with those of the fourth embodiment are denoted by common numerals to omit redundant description.

Figure 7:
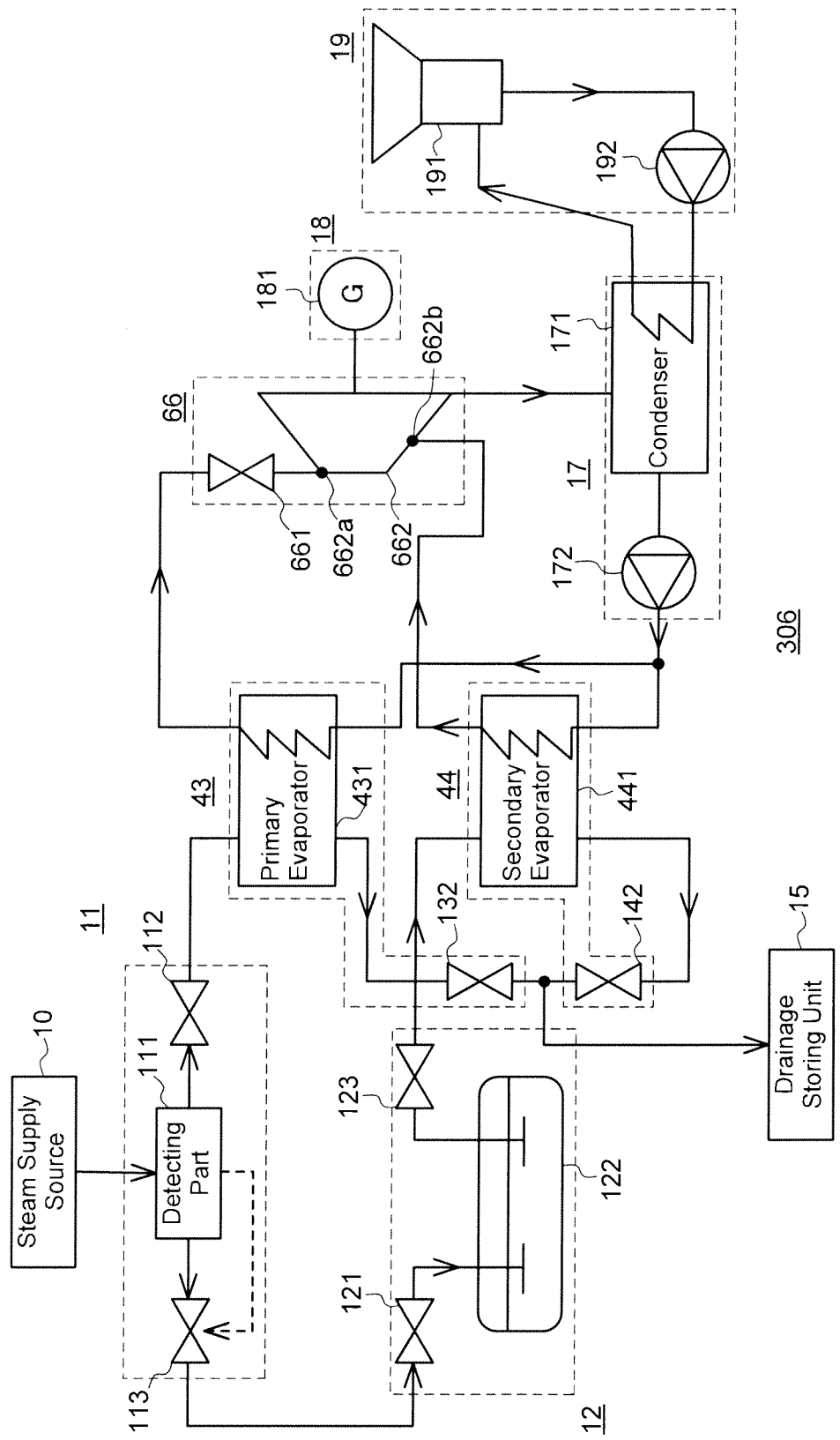
FIG. 7 is a diagram illustrating a configuration of a power generating system according to a sixth embodiment.

As illustrated in FIG. 7, a turbine unit 66 in the power generating system of this embodiment has a steam control valve 661 that adjusts the flow rate of the steam from the primary evaporator 431, and a medium turbine 662 that works by receiving the steam of the low-boiling medium from the steam control valve 661. The medium turbine 662 is connected coaxially with the medium turbine power generator 181 as the power generating unit 18 so that rotation of the medium turbine 662 causes the medium turbine power generator 181 to generate electric power. The medium turbine 662 includes a high-pressure steam inlet 662a to which an output of the steam control valve 661 is connected, and an intermediate-pressure steam inlet 662b that receives steam lower in pressure than the steam received via the steam control valve 661.

In the power generating system 306 of this embodiment, the low-boiling medium in the second system delivered from the medium pump 172 is sent to the primary evaporator 431 of the first heat exchanging unit 43 and also to the secondary evaporator 441 of the second heat exchanging unit 44. Then, the steams of the low-boiling medium generated by heat exchange by the primary evaporator 431 and the secondary evaporator 441 are sent respectively to the high-pressure steam inlet 662a and the intermediate-pressure steam inlet 662b of the medium turbine 662. In other words, the primary evaporator 431 of the first heat exchanging unit 43 and the secondary evaporator 441 of the second heat exchanging unit 44 are connected in parallel with each other with respect to the second system and individually generate the steams of the low-boiling medium in the second system. Then, the primary evaporator 431 and the secondary evaporator 441 send the generated steams of the low-boiling medium respectively to the high-pressure steam inlet 662a and the intermediate-pressure steam inlet 662b of the medium turbine 662 as a mixed pressure turbine.

This embodiment is preferable in the case where the difference between the pressure of the steam outputted from the steam accumulator 122 and the pressure of the steam given from the steam supply source 10 is relatively large. More specifically, when the pressure of the low-boiling medium in the second system generated by the secondary evaporator 441 is lower than the pressure of the low-boiling medium in the second system generated by the primary evaporator 431, the steams generated respectively by the primary evaporator 431 and the secondary evaporator 441 cannot be introduced into the same point of the medium turbine 662. Hence, the steam generated by the secondary evaporator 441 lower in pressure than the steam of the low-boiling medium generated by the primary evaporator 431 is introduced into the intermediate-pressure steam inlet 662b of the medium turbine 662.

In the power generating system 306 of this embodiment, the primary evaporator 431 and the secondary evaporator 441 can introduce the steams to portions at appropriate pressures of the medium turbine 662 respectively. Also in the power generating system of this embodiment, even if the steam generated from the steam supply source 10 is not stable but intermittent, stable electrical output can be obtained.

Seventh Embodiment

Figure 8:
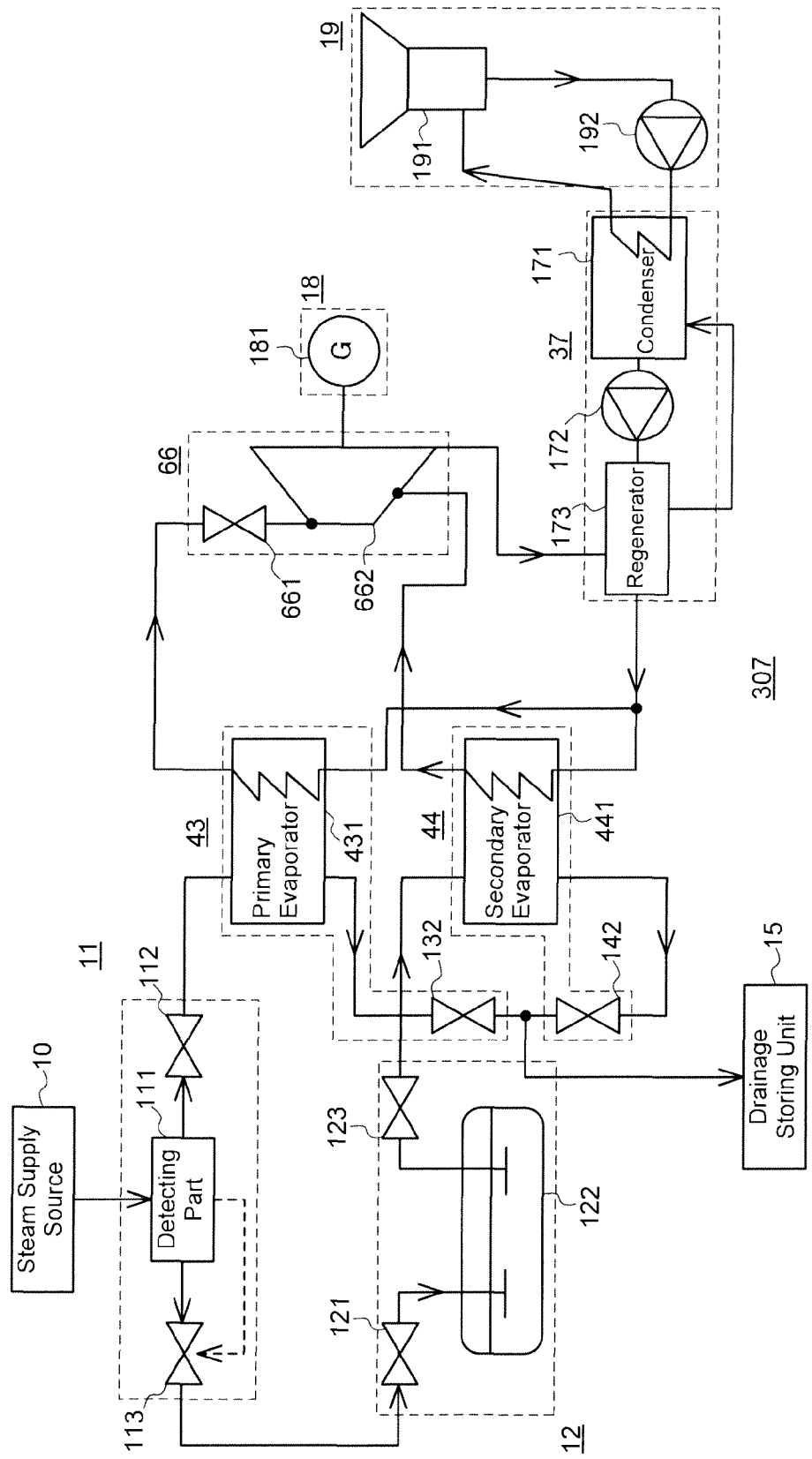
FIG. 8 is a diagram illustrating a configuration of a power generating system according to a seventh embodiment.

Next, a power generating system of a seventh embodiment will be described in detail with reference to FIG. 8. A power generating system 307 of this embodiment is made by modifying the configuration of the third heat exchanging unit 17 in the power generating system of the sixth embodiment. In the following description, components in common with those of the sixth embodiment are denoted by common numerals to omit redundant description. As illustrated in FIG. 8, the third heat exchanging unit 37 in the power generating system of this embodiment has the regenerator 173 in addition to the condenser 171 and the medium pump 172.

The regenerator 173 receives the low-boiling medium which has worked in a medium turbine 662 and transfers heat energy to the low-boiling medium sent by the medium pump 172. The low-boiling medium that obtained the heat energy is cooled in the condenser 171 and returned to the regenerator 173 by the medium pump 172. The third heat exchanging unit 37 of this embodiment can increase the cooling efficiency of the low-boiling medium which has worked in the second system and thus improve the power generation efficiency.

Eighth Embodiment

Next, a power generating system of an eighth embodiment will be described in detail with reference to FIG. 9. A power generating system 408 of this embodiment is made by disposing a back pressure steam turbine 115 in the first system in the power generating system 102 of the second embodiment. In the following description, components in common with those of the second embodiment are denoted by common numerals to omit redundant description.

Figure 9:
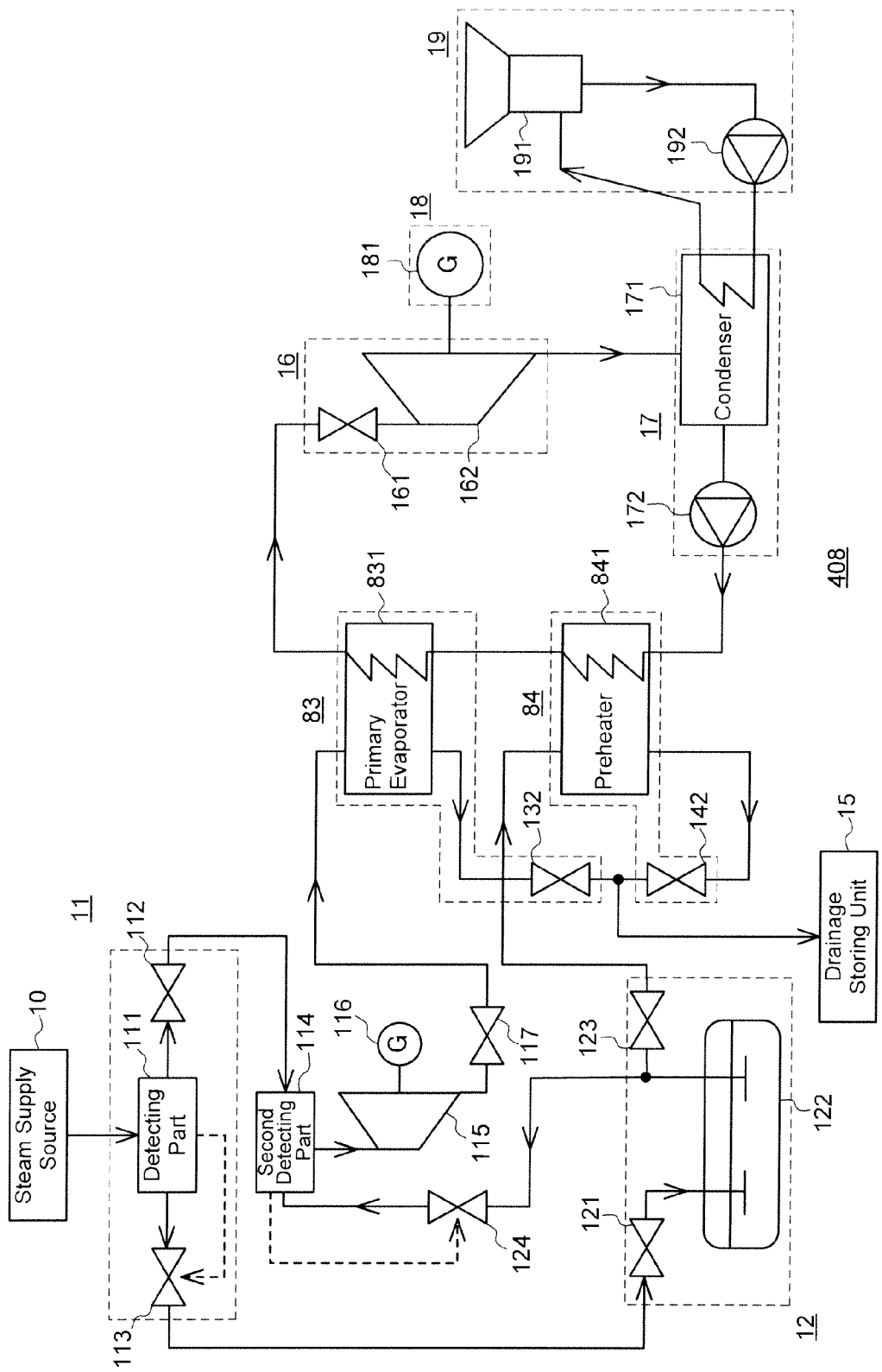
FIG. 9 is a diagram illustrating a configuration of a power generating system according to an eighth embodiment.

As illustrated in FIG. 9, the power generating system 408 of this embodiment has the back pressure steam turbine 115 that receives the steam from the steam supply source 10 sent via the pressure adjusting valve 112 and the steam from the output of the steam accumulator 122 sent via an adjusting valve 124, a power generator 116 that generates electric power by rotational movement of the back pressure steam turbine 115, and a pressure adjusting valve 117 that adjusts the discharge flow rate of the steam which has worked in the back pressure steam turbine 115. Between the pressure adjusting valve 112 and an input of the back pressure steam turbine 115, a second detecting part 114 that detects the flow rate of the steam sent from the pressure adjusting valve 112 is disposed and configured to be able to control the flow rate of the steam passing through the adjusting valve 124 according to the detection result.

When detecting that the flow rate of the steam from the pressure adjusting valve 112 is equal to or less than a flow rate that is enough to rotate the back pressure steam turbine 115, the second detecting part 114 opens the adjusting valve 124 to introduce the steam from the steam accumulator 122 to the input of the back pressure steam turbine 115. In other words, the second detecting part 114 acts to control the adjusting valve 124 so as to keep the rotation of the back pressure steam turbine 115.

A first heat exchanging unit 83 has a primary evaporator 831 that receives the steam sent from the back pressure steam turbine 115 via the pressure adjusting valve 117 and shifts heat energy to the second system, and the backflow valve 132 that discharges the steam which has transferred heat in the primary evaporator 831 and prevents backflow of the steam. Similarly, a second heat exchanging unit 84 has a preheater 841 that receives the steam from the steam accumulator adjusting valve 123 of the heat accumulating unit 12, and the backflow valve 142 that discharges the steam which has transferred heat in the preheater 841 and prevents backflow of the steam. Note that the preheater 841 and the primary evaporator 831 are connected in series so that the low-boiling medium in the second system is first preheated by the preheater 841 and then converted into steam by the primary evaporator 831. Both outputs of the backflow valves 132 and 142 of the first heat exchanging unit 83 and the second heat exchanging unit 84 are led to the drainage storing unit 15.

When receiving the steam at a temporally unstable flow rate from the steam supply source 10, the detecting part 111 of the steam dividing unit 11 detects the flow rate of the steam and controls the pressure adjusting valve 113 to adjust the flow rate of the steam to the heat accumulating unit 12. When receiving the steam via the steam accumulator adjusting valve 121, the steam accumulator 122 of the heat accumulating unit 12 accumulates the steam and reduces pressure of the steam. Thus, the steam accumulator 122 acts to temporally level the steam received from the steam supply source 10.

In this embodiment, there is a difference between the pressure of the steam outputted from the steam accumulator 122 and the pressure of the steam given from the steam supply source 10. Hence, the steam from the steam supply source 10 is supplied to the back pressure steam turbine 115 to work there. As a result, the pressure of the steam supplied to the primary evaporator 831 via the pressure adjusting valve 117 can be made closer to the pressure of the steam supplied to the preheater 841 via the steam accumulator adjusting valve 123. This contributes to making the energy transfer from the first system to the second system more efficient.

According to the power generating system of this embodiment, the pressure of the steam from the steam supply source 10 is made closer to the pressure of the steam from the steam accumulator 122 using the back pressure steam turbine 115, so that the efficiency of the whole power generating system can be increased.

Ninth Embodiment

Figure 10:
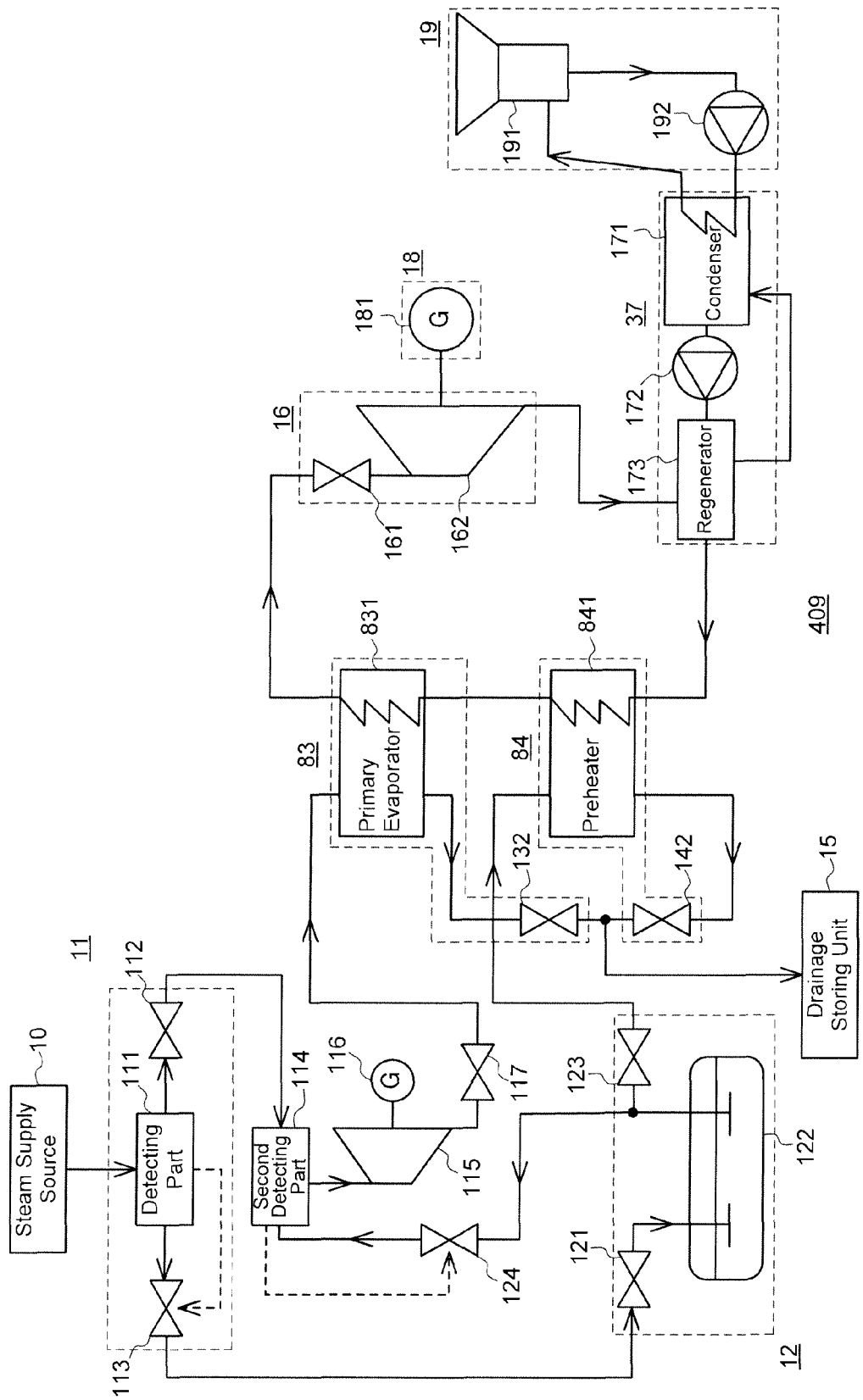
FIG. 10 is a diagram illustrating a configuration of a power generating system according to a ninth embodiment.

Next, a power generating system of a ninth embodiment will be described in detail with reference to FIG. 10. A power generating system 409 of this embodiment is made by modifying the configuration of the third heat exchanging unit 17 in the power generating system of the eighth embodiment. In the following description, components in common with those of the eighth embodiment are denoted by common numerals to omit redundant description. As illustrated in FIG. 10, the third heat exchanging unit 37 in the power generating system of this embodiment has the regenerator 173 in addition to the condenser 171 and the medium pump 172.

The regenerator 173 receives the low-boiling medium which has worked in the medium turbine 162 and transfers heat energy to the low-boiling medium sent by the medium pump 172. The low-boiling medium that obtained the heat energy is cooled in the condenser 171 and returned to the regenerator 173 by the medium pump 172. The third heat exchanging unit 37 of this embodiment can increase the cooling efficiency of the low-boiling medium which has worked in the second system and thus improve the power generation efficiency.

(Configuration of Tenth Embodiment)

Next, a power generating system of a tenth embodiment will be described in detail with reference to FIG. 11. A power generating system 510 of this embodiment is made by modifying the configurations of the primary evaporator and the preheater in the power generating system of the eighth embodiment. In the following description, components in common with those of the eighth embodiment are denoted by common numerals to omit redundant description.

Figure 11:
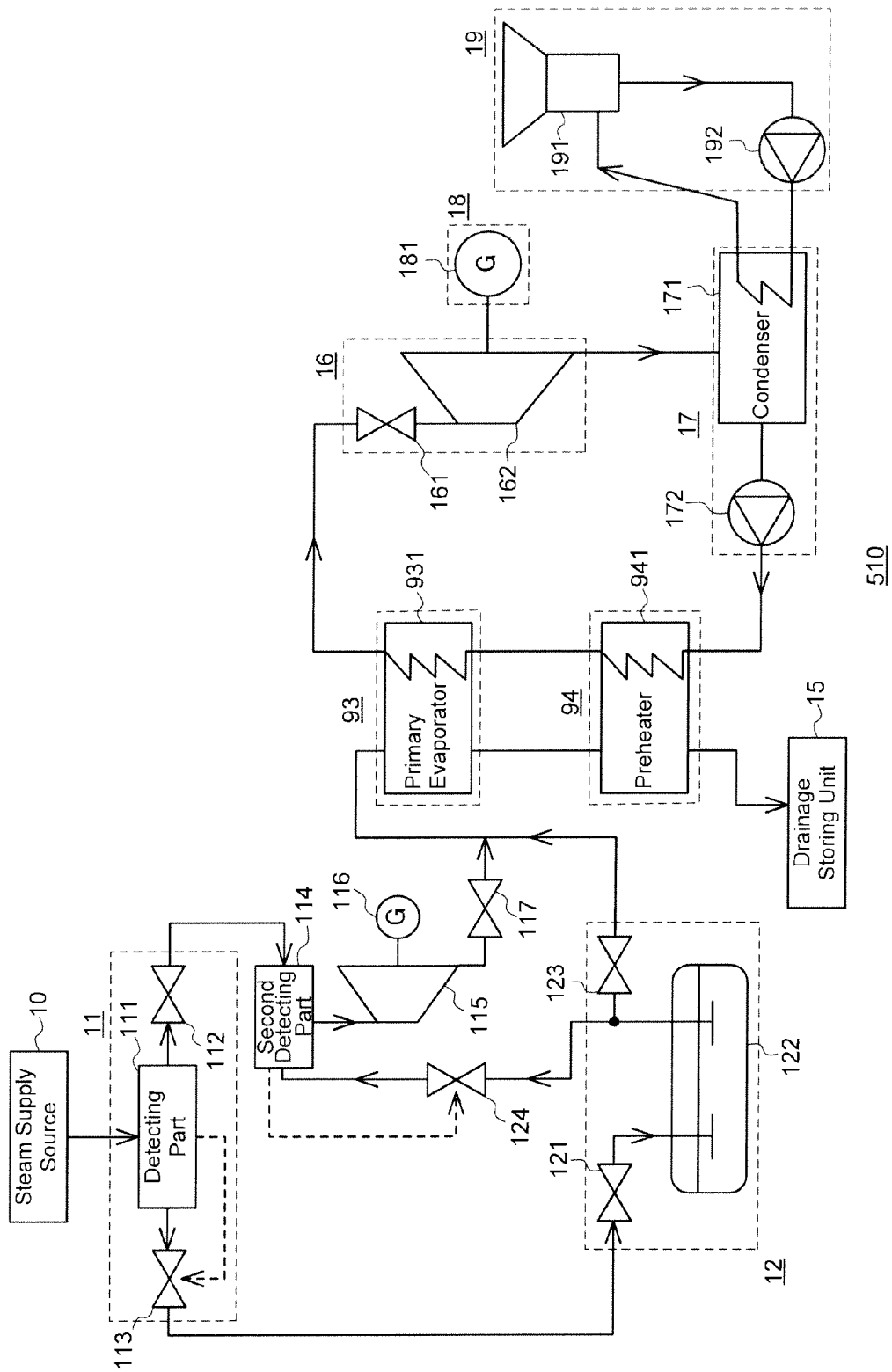
FIG. 11 is a diagram illustrating a configuration of a power generating system according to a tenth embodiment.

As illustrated in FIG. 11, the power generating system 510 of this embodiment has the back pressure steam turbine 115 that receives the steam from the steam supply source 10 sent via the pressure adjusting valve 112 and the steam from the output of the steam accumulator 122 sent via the adjusting valve 124, the power generator 116 that generates electric power by rotational movement of the back pressure steam turbine 115, and the pressure adjusting valve 117 that adjusts the discharge flow rate of the steam which has worked in the back pressure steam turbine 115. Between the pressure adjusting valve 112 and the input of the back pressure steam turbine 115, the second detecting part 114 that detects the flow rate of the steam sent from the pressure adjusting valve 112 is disposed and configured to be able to control the flow rate of the steam passing through the adjusting valve 124 according to the detection result.

When detecting that the flow rate of the steam from the pressure adjusting valve 112 is equal to or less than a flow rate that is enough to rotate the back pressure steam turbine 115, the second detecting part 114 opens the adjusting valve 124 to introduce the steam from the steam accumulator 122 to the input of the back pressure steam turbine 115. In other words, the second detecting part 114 acts to control the adjusting valve 124 so as to keep the rotation of the back pressure steam turbine 115.

A first heat exchanging unit 93 has a primary evaporator 931 that receives the steam sent from the back pressure steam turbine 115 via the pressure adjusting valve 117 and the steam sent from the steam accumulator 122 via the steam accumulator adjusting valve 123 and shifts heat energy to the second system. A second heat exchanging unit 94 has a preheater 941 that receives the steam which has transferred heat energy to the second system in the primary evaporator 931 and transfers heat energy to the second system. The steam which has preheated the low-boiling medium in the second system in the preheater 941 is sent to the drainage storing unit 15. The preheater 941 and the primary evaporator 931 are connected in series so that the low-boiling medium in the second system is first preheated by the preheater 941 and then converted into steam by the primary evaporator 931.

(Operation of Tenth Embodiment)

When receiving the steam at a temporally unstable flow rate from the steam supply source 10, the detecting part 111 of the steam dividing unit 11 detects the flow rate of the steam and controls the pressure adjusting valve 113 to adjust the flow rate of the steam to the heat accumulating unit 12. When receiving the steam via the steam accumulator adjusting valve 121, the steam accumulator 122 of the heat accumulating unit 12 accumulates the steam and reduces pressure of the steam and sends the reduced-pressure steam to the primary evaporator 931 via the steam accumulator adjusting valve 123. As a result, the primary evaporator 931 will receive the steam which has been made lower in pressure than the steam received from the steam supply source 10 and temporally leveled.

In this embodiment, there is a difference between the pressure of the steam outputted from the steam accumulator 122 and the pressure of the steam given from the steam supply source 10. Hence, the steam from the steam supply source 10 is supplied to the back pressure steam turbine 115 to work there. In this event, when the amount of work in the back pressure steam turbine 115 is appropriately set, the pressure of the steam which works in the back pressure steam turbine 115 and is outputted via the pressure adjusting valve 117 can be reduced to the same level as the pressure of the steam which is temporally leveled in the steam accumulator 122 and outputted via the steam accumulator adjusting valve 123.

The primary evaporator 931 performs heat exchange using the steam outputted from the back pressure steam turbine 115 and the steam outputted from the steam accumulator 122 which have been adjusted to substantially the same pressure to convert the low-boiling medium in the second system into steam. Further, the preheater 941 performs heat exchange using the steam which has been reduced in temperature and pressure due to the heat exchange in the primary evaporator 931 to preheat the low-boiling medium in the second system.

The preheater 941 is disposed on the upstream side of the primary evaporator 931 in the second system. More specifically, the preheater 941 preheats the low-boiling medium which has been cooled by the condenser 171, using the steam which has transferred heat in the primary evaporator 931, and sends the preheated steam to the primary evaporator 931. The primary evaporator 931 evaporates the low-boiling medium preheated by the preheater 941, using the steam sent from the back pressure steam turbine 115 and the steam sent from the steam accumulator 122, and sends the evaporated low-boiling medium to the medium turbine 162.

According to the power generating system of this embodiment, even if the steam generated from the steam supply source 10 is not stable but intermittent, stable electrical output can be obtained.

Eleventh Embodiment

Figure 12:
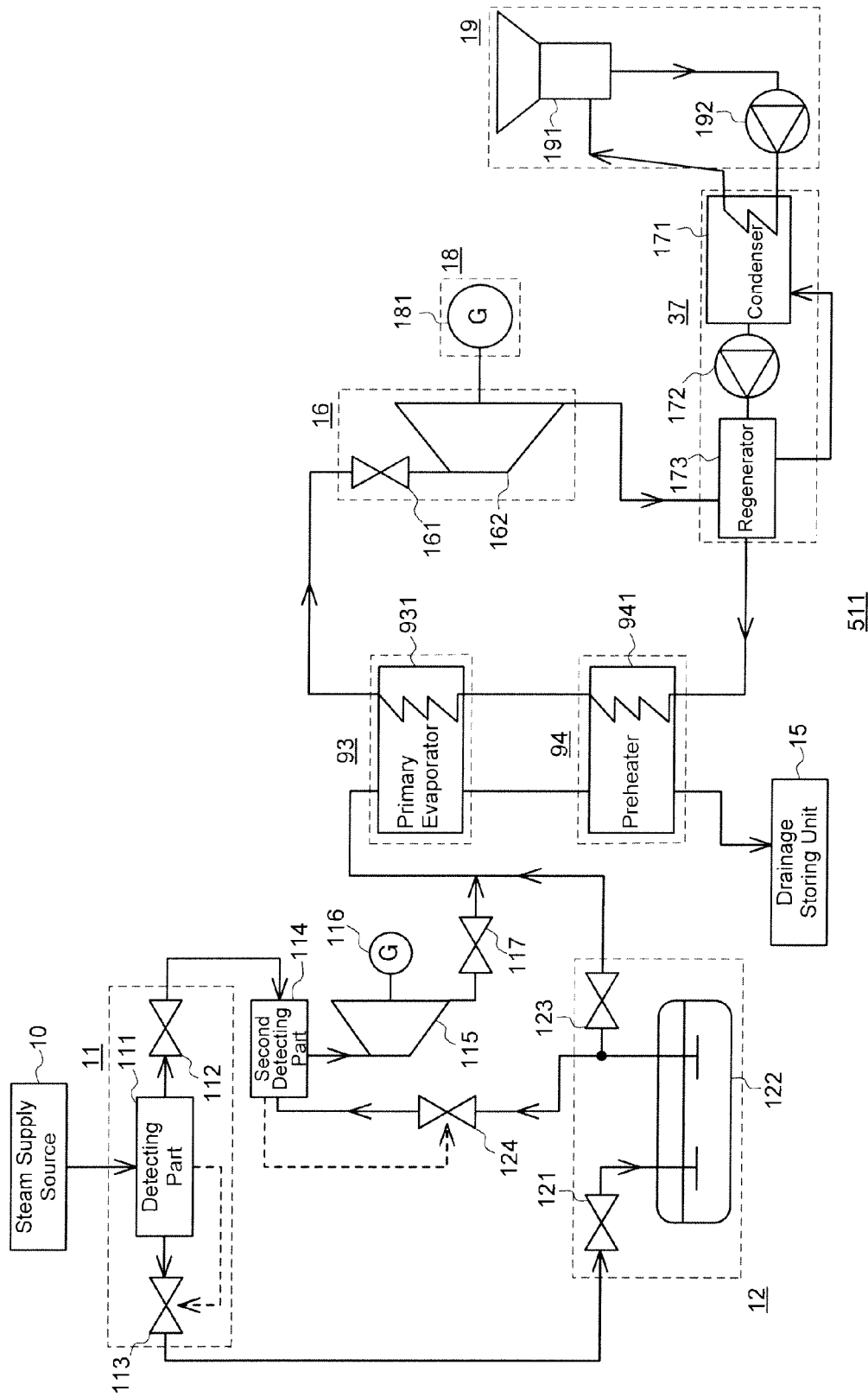
FIG. 12 is a diagram illustrating a configuration of a power generating system according to an eleventh embodiment.

Next, a power generating system of an eleventh embodiment will be described in detail with reference to FIG. 12. A power generating system 511 of this embodiment is made by modifying the configuration of the third heat exchanging unit 17 in the power generating system of the tenth embodiment. In the following description, components in common with those of the tenth embodiment are denoted by common numerals to omit redundant description. As illustrated in FIG. 12, the third heat exchanging unit 37 in the power generating system of this embodiment has the regenerator 173 in addition to the condenser 171 and the medium pump 172.

The regenerator 173 receives the low-boiling medium which has worked in the medium turbine 162 and transfers heat energy to the low-boiling medium sent by the medium pump 172. The low-boiling medium that obtained the heat energy is cooled in the condenser 171 and returned to the regenerator 173 by the medium pump 172. The third heat exchanging unit 37 of this embodiment can increase the cooling efficiency of the low-boiling medium which has worked in the second system and thus improve the power generation efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power generating system, comprising:
   a flow dividing structure dividing a first heat medium supplied thereto to a first flow path and a second flow path, the flow dividing structure comprising:
      a first detector detecting a flow rate of the first heat medium supplied to the flow dividing structure; and
      a flow dividing adjusting valve opening the second flow path when the flow rate of the first heat medium supplied to the flow dividing structure exceeds a predetermined value, based on a detection result of the first detector;
   a heat accumulator accumulating the first heat medium sent thereto via the second flow path and delivering the first heat medium at a temporally leveled flow rate;
   a heat exchanger transferring heat from the first heat medium sent thereto via the first flow path and the first heat medium sent thereto from the heat accumulating unit, to a second heat medium having a lower boiling point than the first heat medium; and
   a turbine rotationally moving by the second heat medium with heat having been transferred by the heat exchanger.

2. The system according to claim 1,
   wherein the heat exchanger comprises:
      a preheater transferring heat from the first heat medium delivered thereto from the heat accumulator, to the second heat medium; and
      an evaporator transferring heat from the first heat medium sent thereto via the first flow path, to the second heat medium preheated by the preheater,
   wherein the turbine rotationally moves by the second heat medium with heat having been transferred by the evaporator.

3. The system according to claim 2, further comprising a back pressure turbine disposed between the flow dividing structure and the evaporator in the first flow path, the back pressure turbine rotationally moving by the first heat medium sent thereto via the first flow path,
   wherein the evaporator transfers heat from the first heat medium having worked in the back pressure turbine to the second heat medium.

4. The system according to claim 1,
   wherein the heat exchanger exchanging unit comprises:
      a primary evaporator transferring heat from the first heat medium sent thereto via the first flow path, to the second heat medium; and
      a secondary evaporator transferring heat from the first heat medium delivered thereto from the heat accumulator, to the second heat medium, and
   wherein the turbine rotationally moves by the second heat medium with heat having been transferred by the primary evaporator and the second heat medium with heat having been transferred by the secondary evaporator.

5. The system according to claim 4,
   wherein the turbine comprises:
      a high-pressure inlet receiving the second heat medium with heat having been transferred by the primary evaporator; and
      an intermediate-pressure inlet receiving the second heat medium with heat having been transferred by the secondary evaporator lower in pressure than the second heat medium received at the high-pressure inlet.

6. The system according to claim 1, further comprising a back pressure turbine rotationally moving by the first heat medium sent thereto via the first flow path,
   wherein the heat exchanger comprises:
      a primary evaporator transferring heat from the first heat medium having worked in the back pressure turbine to the second heat medium; and
      a preheater transferring heat from the first heat medium having worked in the primary evaporator to the second heat medium, the primary evaporator transferring heat to the second heat medium with heat having been transferred by the preheater, and
   wherein the back pressure turbine is disposed between the flow dividing structure and the primary evaporator in the first flow path.

7. The system according to claim 1, further comprising a cooler cooling the second heat medium having worked in the turbine.

8. The system according to claim 7,
   wherein the cooler comprises a regenerator performing heat exchange of heat energy of the second heat medium.

* * * * *